US007760864B1

(12) United States Patent
Best et al.

(10) Patent No.: US 7,760,864 B1
(45) Date of Patent: Jul. 20, 2010

(54) RESTRICT RESTORE FUNCTION FOR NETWORK SERVICE PROVIDERS

(75) Inventors: Robert Best, Highlands Ranch, CO (US); Hossein Eslambolchi, Los Altos Hills, CA (US); John McCanuel, Bailey, CO (US); Saeid Shariati, Basking Ridge, NJ (US); Prakash Vasa, Millstone, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 948 days.

(21) Appl. No.: 11/479,375

(22) Filed: Jun. 30, 2006

(51) Int. Cl.
*H04M 3/42* (2006.01)

(52) U.S. Cl. .................................. 379/201.12; 709/223

(58) Field of Classification Search ............ 379/201.12, 379/201.02; 709/223
See application file for complete search history.

(56) References Cited

U.S. PATENT DOCUMENTS

| 7,346,277 | B2 * | 3/2008 | Atkinson et al. ............... 398/7 |
| 2003/0074463 | A1 * | 4/2003 | Swartz et al. ............... 709/230 |
| 2004/0064555 | A1 * | 4/2004 | Cuny et al. ............... 709/225 |
| 2005/0204030 | A1 * | 9/2005 | Koch et al. ............... 709/223 |
| 2006/0021050 | A1 * | 1/2006 | Cook et al. ................... 726/25 |

* cited by examiner

*Primary Examiner*—Creighton Smith
(74) *Attorney, Agent, or Firm*—Hoffmann & Baron, LLP

(57) ABSTRACT

A method of modifying a network service comprising, identifying a service to be modified, determining services affected by the identified service; and performing a modification of the service level of at least the identified service, wherein the modification of the service level comprises a logical interruption of at least the identified service.

19 Claims, 5 Drawing Sheets

RESTRICT RESTORE FUNCTION FOR NETWORK SERVICE PROVIDERS

FIELD OF THE INVENTION

The present invention relates to methods for restricting and restoring network services. More specifically, the present invention relates to performing a soft disconnect of a service for a predetermined time period followed by a hard disconnect of the service and all subtending services.

BACKGROUND OF THE INVENTION

Typically, when a network service provider receives a request from a customer for a service disconnect, the provider responds by physically removing the service from the network inventory and stopping billing. However, problems are associated with this approach. For example, at least about 10% of the time, the customer contacts the provider and indicates that they want service restored, or that they want to postpone the service disconnect date. The provider must then scramble in order to reinstate billing and put back the facilities necessary to restore the network service. Moreover, the process for restoring the network service often does not have any administrative structure to it, so the provider cannot bill the customer for restoring the service.

A further problem associated with current methods for disconnecting a network service is that of idle subtending services. For example, a request from a customer for a service disconnect typically results in a complete physical removal of that service from the network. However, services affected by the disconnected service, such as subtending services, are often not removed from the network. The result is that the provider's inventory is being used up by the idle subtending services, and yet the provider cannot bill for these idle network services.

In view of the foregoing, it would be advantageous to provide a method of disconnecting a network service which does not have these disadvantages. In particular, it would be advantageous to provide a service disconnect method whereby service and billing can be readily restored when a restore service order is received from the customer, and whereby the provider's inventory can be spared.

SUMMARY OF THE INVENTION

Applicant has overcome the shortcomings of prior art methods with the present invention by providing a computer implemented method for controlling the connections to a large communications network for a particular customer.

The present invention therefore provides a method of modifying a network service comprising, identifying a service to be modified, determining services affected by the identified service; and performing a modification of the service level of at least the identified service, wherein the modification of the service level comprises a logical interruption of at least the identified service.

DETAILED DESCRIPTION OF THE PREFERRED EMBODIMENTS

Figure 1:
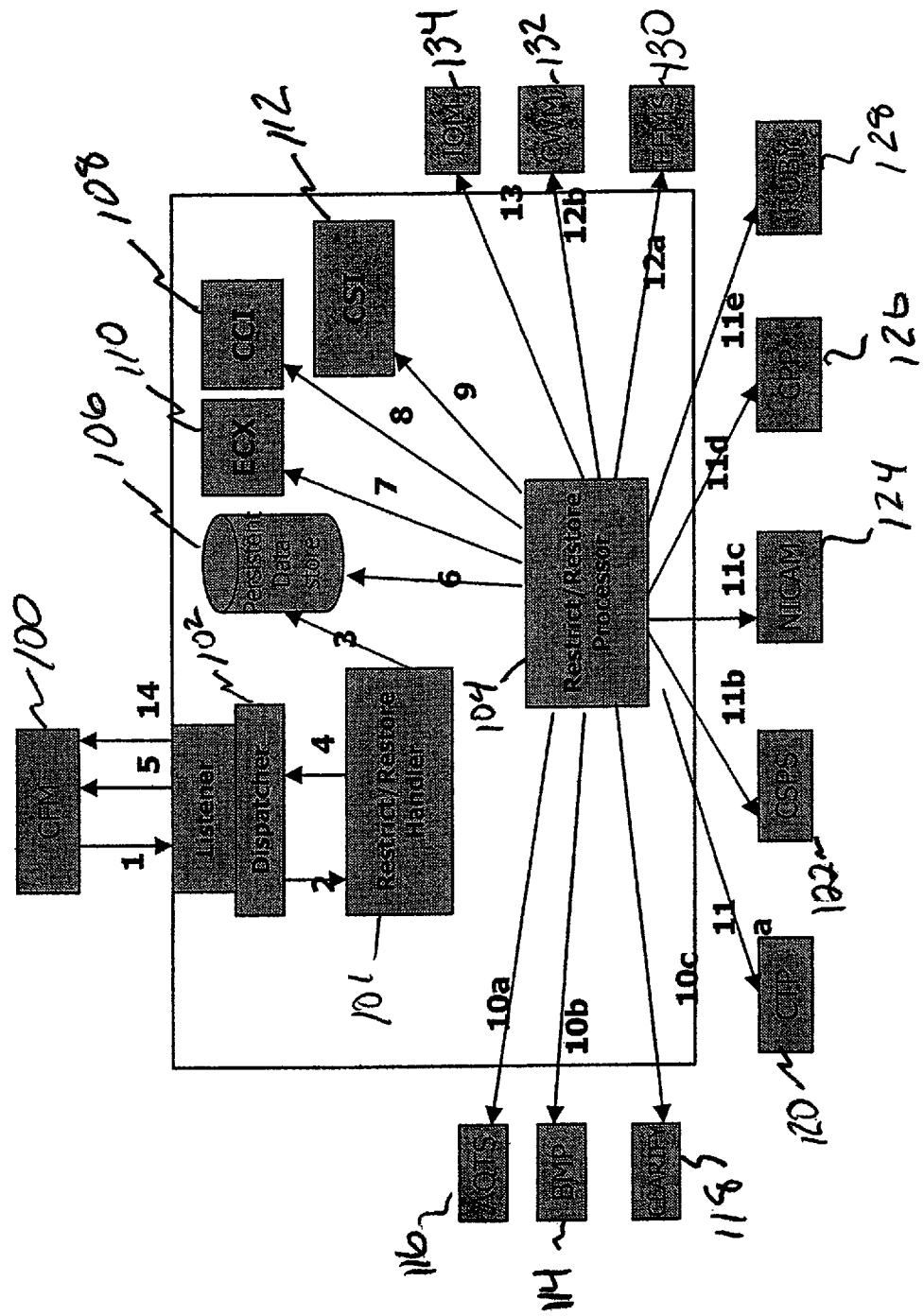
FIG. 1 is a block diagram of the restrict/restore events and process flow method according to the present invention.

There will be detailed below the preferred embodiments of the present invention with reference to the accompanying drawings. Like members are designated by like reference characters in all figures.

| | |
|---|---|
| CCI: | End State Database |
| ECX: | End State Database |
| MCN: | End State Database |
| GRC: | Data Group Code |
| SO: | Sales data Code |
| CSI: | Database Identifier |
| MCN/SO/BG's: | Master Customer Number, customer identifier |
| BMP: | Ticket, a data flag |
| AOTS: | Ticket, a data flag |
| CSPS: | Provisioning application |
| NICAM: | Provisioning Application |
| CPP: | Provisioning Application |
| EFMS: | Workflow Application |
| CWM: | Workflow Application |
| IOM: | Ordering Application |

Referring now to the Figures there is shown an embodiment of a system according to the present invention. The system is suitable for implementation of the subject method of restricting or restoring a network service Turning now to FIG. 1, there is shown a block diagram of the restrict/restore events and process flow method according to the present invention. In step 1, the Customer Financial Management (CFM) 100 sends account number identification, biller identification and action type, either restrict or restore as part of a request to database of reference (DBOR). The dispatcher sends information to the restrict-restore handler 101 in Step 2. The handler updates the database in Step 3 and then in Step 4 responds to the dispatcher 102 with validity of the request. The Dispatcher in turn, response to the CFM with validity of the request in Step 5. In Step 6 the Restrict-Restore Processor 104 reads the outstanding restrict/restore requests from the persistent data base store 106, and then in Step 7 accesses CCI 108 to provide the mapping of the CFM account number to the Customer and Customer's Billing Accounts. The Restrict-Restore Processor accesses ECX 110 to retrieve customer account details such as for example MCN, GRC or SO, for a list of services that a customer has subscribed to and Inventory keys such as circuit ID, Port ID and PVC-ID. Once Step 8 is complete, the Restrict-Restore Processor accesses CSI 112 to retrieve inventory details in Step 9 and initiates Step 10, which includes Step 10a, Restrict-Restore Processor will send the MCN/SO/BG's to BMP 114 to create or close a restrict ticket for data services. In Step 10b, the Restrict-Restore Processor will send MCN/SO/BG's to AOTS 116 to create/close a restrict ticket for managed services, and in Step 10c the Restrict-Restore Processor will send MCN/SO/BG's to Clarify 118 to create/close a restrict ticket for management information systems (MIS) services. The Restrict-Restore Processor sends a restrict/restore request to the: Common Test Platform (CTP) 120 for data services in step 11a, to CSPS 122 for switched inbound services in Step 11b, to NICAM 124 for switched outbound services in Step 11c, and to CPP 126 for credit card services in Step 11d. In Step 11e the Restrict-Restore Processor sends a restrict/restore action request to RUBY 128. If the Action type is restrict, RUBY should suppress all the alarms for the particular service. If the action type is restore, RUBY should start processing the alarms again for all the alarms for the particular service. Turning to Step 12, in Step 12a, the Restrict-Restore Processor sends Restrict/Restore status indicator to EFMS 130 to suspend workflow, in Step 12b the Processor sends Restrict/Restore status indicator to CWM 132. In Step 13 the Restrict Restore Processor sends Restrict/Restore status indicator to IOM 134 to suspend pending orders and stop new orders. Finally, in Step 14 the Dispatcher sends CFM 100 Restrict/Restore status indicator.

Figure 2:
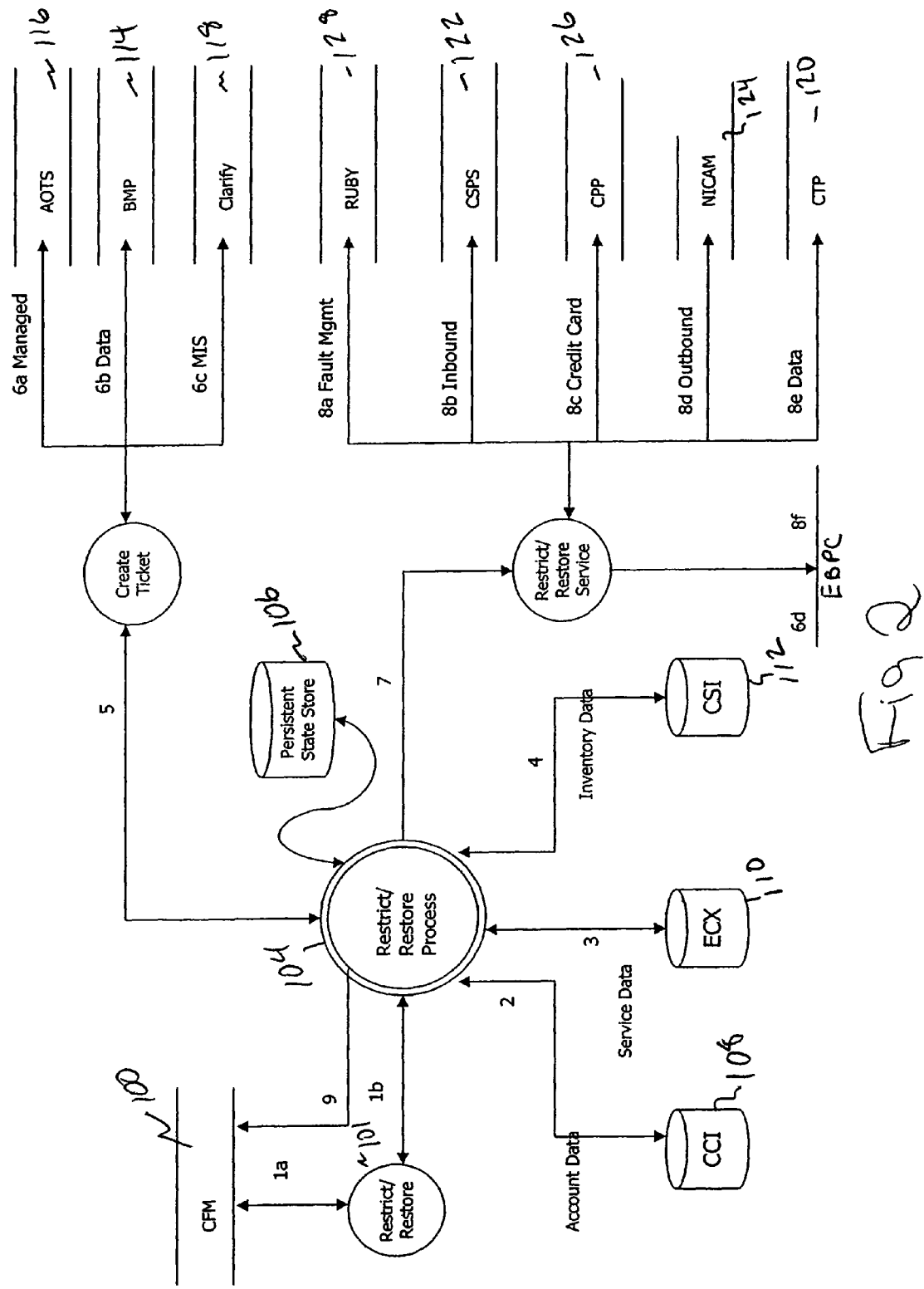
FIG. 2 is a flow chart depicting the activity flow for in-effect service restrict/restore method according to the present invention for soft disconnects.
Figure 3:
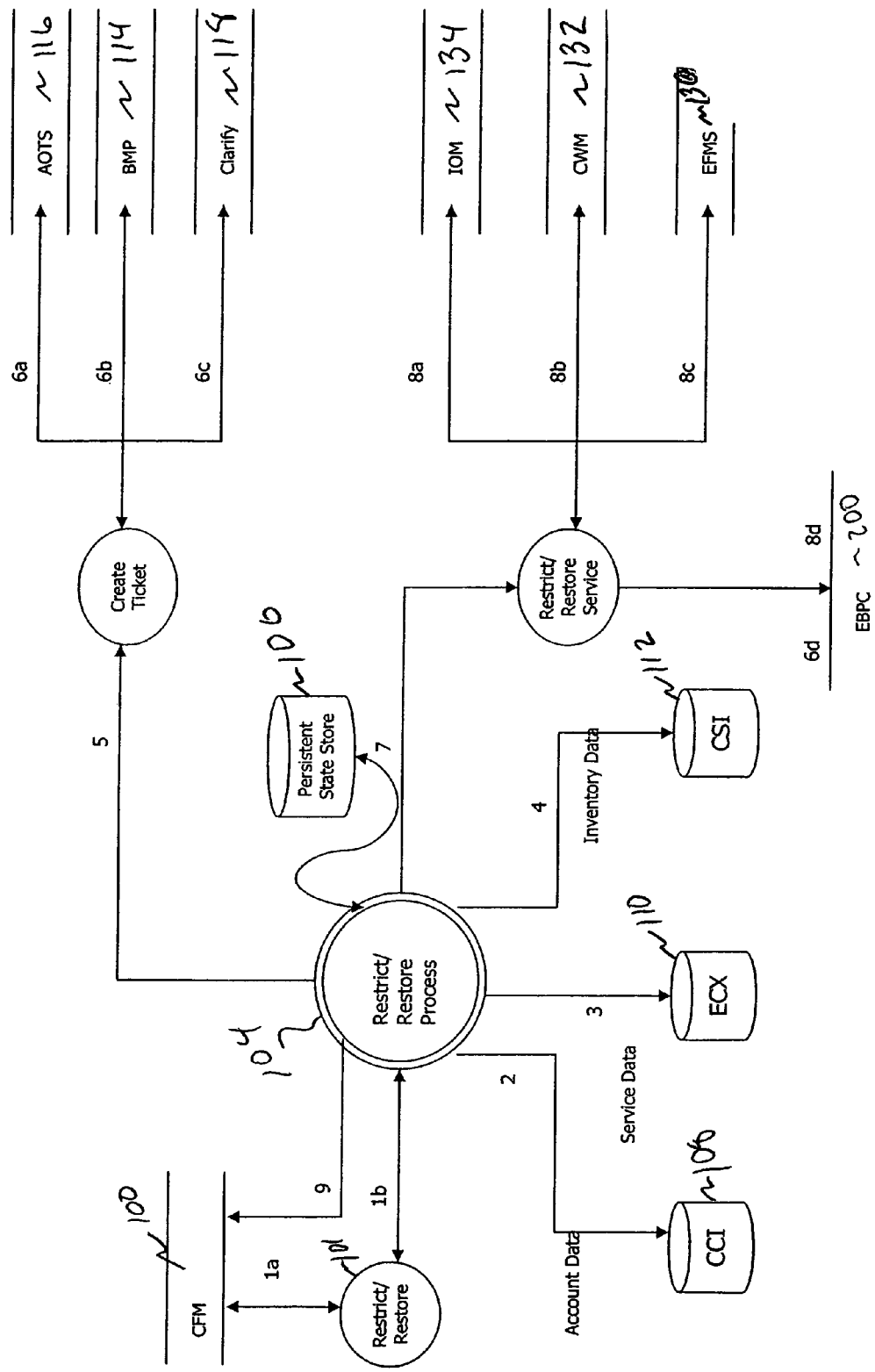
FIG. 3 is a flow chart depicting the activity flow for in-effect service restrict/restore method according to the present invention for hard disconnects.

Turning to FIG. 2, there is shown a flow chart depicting the activity flow for in-effect service restrict/restore method according to the present invention for soft disconnects. In accordance with the events and process flow described with respect to FIG. 1 the activity flow includes the following steps. In Step 1a, the Customer Financial Management (CFM) 100 sends account number identification, biller identification and action type, either restrict or restore as part of a request to DBOR. The dispatcher sends information to the restrict-restore handler 101 in Step 2. The handler updates the database in Step 3 and then in Step 4 responds to the dispatcher 102 with validity of the request. In Step 6, which includes Step 6a, Restrict-Restore Processor 104 will send the MCN/SO/BG's to BMP 114 to create or close a restrict ticket for data services. In Step 6b, the Restrict-Restore Processor will 6c the Restrict-Restore Processor will send MCN/SO/BG's to Clarify 118 to create/close a restrict ticket for MIS services. In Step 7 the Restrict-Restore Processor sends a restrict/restore request to the Rule Builder for Yourself ("RUBY") for data services in step 8a, to CSPS 122 for switched inbound services in Step 8b, to NICAM 124 for switched outbound services in Step 8c, and to CPP 126 for credit card services in Step 8d and in Step 8e the Restrict-Restore Processor 104 sends a restrict/restore action request to CTP 120. Turning to FIG. 3, there is shown a flow chart depicting the activity flow for in-effect service restrict/restore method according to the present invention for hard disconnects. The activity shows in Step 1a, the Customer Financial Management (CFM) 100 sends account number identification, biller identification and action type, either restrict or restore as part of a request to DBOR. The dispatcher 102 sends information to the restrict-restore handler 101 in Step 2. The handler updates the database in Step 3 and then in Step 4 responds to the dispatcher 102 with validity of the request. In Step 6, which includes Step 6a, Restrict-Restore Processor 104 will send the MCN/SO/BG's to BMP 114 to create or close a restrict ticket for data services. In Step 6b, the Restrict-Restore Processor 104 will 6c the Restrict-Restore Processor will send MCN/SO/BG's to Clarify 118 to create/close a restrict ticket for MIS services. In Step 7 the Restrict-Restore Processor 104 sends a restrict/restore request to the Persistent State Store 100. In step 8a, the Restrict Restore Service the Processor 104 sends to a Restrict Restore Service to IOM 134. In Step 8b, the Restrict Restore Service the Processor 104 sends to a Restrict Restore Service to CWM 132 and to EFMS 130 in Step 8c and to EFMS 130 in Step 8d.

Figure 4:
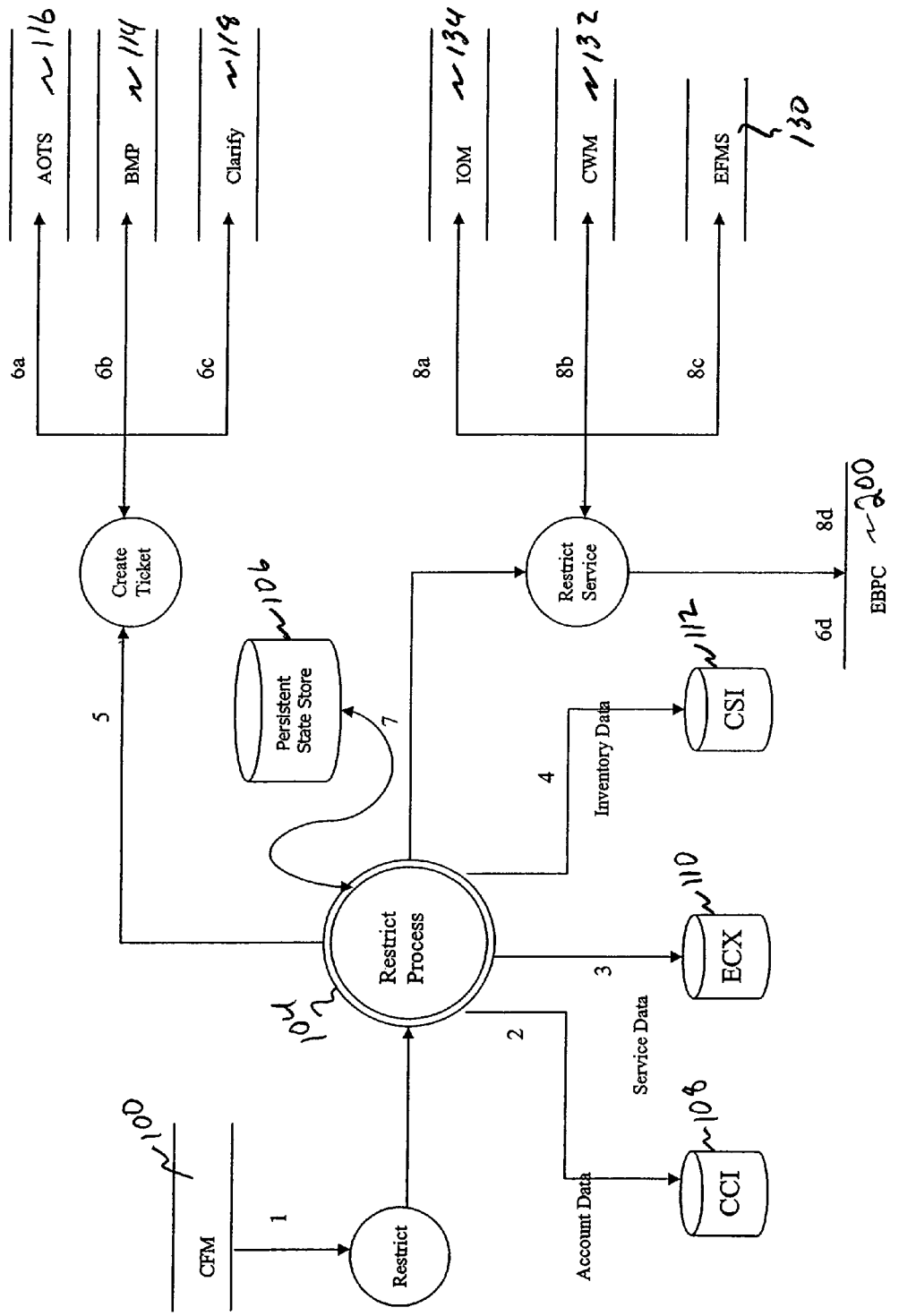
FIG. 4 is a flow chart depicting the activity flow for in-effect service restrict/restore method according to the present invention for in-flight orders.

Turning to FIG. 4 there is shown a flow chart depicting the activity flow for in-effect service restrict/restore method according to the present invention for in-flight orders. The activity shows in Step 1 the Customer Financial Management (CFM) 100 sends account number identification, biller identification and action type, either restrict or restore as part of a request to DBOR. The dispatcher 102 sends information to the restrict-restore handler 101 in Step 2. The handler updates the database in Step 3 and then in Step 4 responds to the dispatcher with validity of the request. In Step 6, which includes Step 6a, Restrict-Restore Processor 104 will send the MCN/SO/BG's to BMP 114 to create or close a restrict ticket for data services. In Step 6b, the Restrict-Restore Processor 104 will 6c the Restrict-Restore Processor will send MCN/SO/BG's to Clarify 118 to create/close a restrict ticket for MIS services. In Step 7 the Restrict-Restore Processor 104 sends a restrict/restore request to the Persistent State Store 106. In step 8a, the Restrict Restore Service the Processor 104 sends to a Restrict Restore Service to IOM 134. In Step 8b, to CWM 132 and to EFMS 130 in Step 8c and to EBPC 200 in Step 8d.

Figure 5:
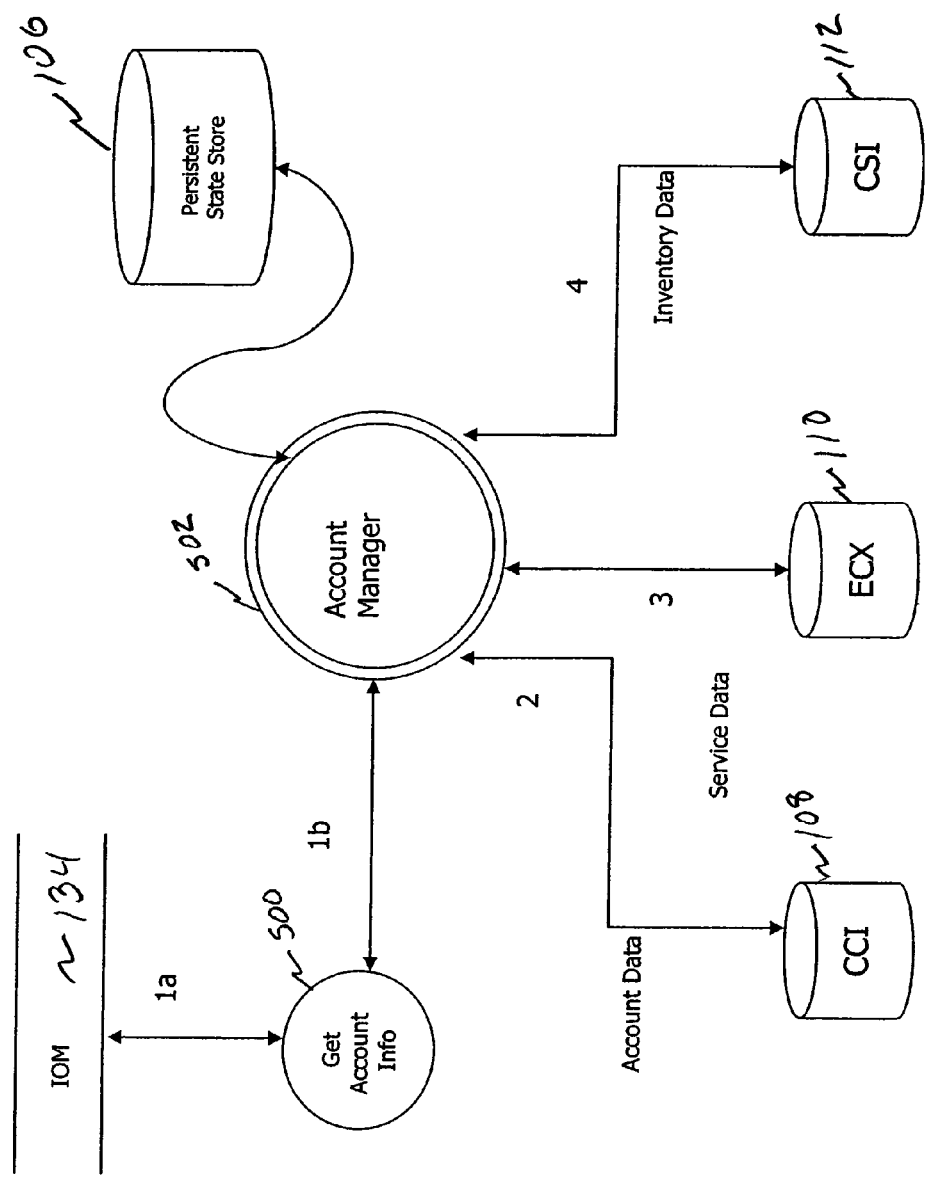
FIG. 5 is a flow chart depicting the activity flow for in-effect service restrict/restore method according to the present invention for existing contracts.

Turning to FIG. 5 there is shown a flow chart depicting the activity flow for in-effect service restrict/restore method according to the present invention for existing contracts. In Step 1a the IOM 134 send a request to Get Account Info, 500 which relays to the Account Manager 502, In Step 2 the Account Manager sends account data to CCI 108 Service Data to ECX 110, in Step 3, and Inventory Data to CSI 112 in Step 4. The Persistent State Store 106 is updated to reflect account manager activity.

Thus, the system of the present invention ensures an automatic restrict or restore of the requested network service (or component), such that the customer can initially experience the feeling of a complete removal of that service from the network, but without an initial physical or hard disconnect of any components. The system also ensures proper handling of all orders in the event that a customer cancels the restrict or restore request or postpones the service change date. Because the service change is initially performed using a soft disconnect mechanism, service and billing can be readily restored in this instance by performing a soft reconnect of the service. As described above, the present invention further ensures a complete physical removal from the network of all components of the technology on which a soft-disconnected service is based. This optimizes availability of network inventory so that it can readily be reallocated for use by other customers. Optionally, the customer may be notified of the affected services. Also, optionally, the customer may be contacted to confirm if they want to proceed with the service change. For example, the person requesting the change service order may not have been authorized by the customer to make such a request. Moreover, the customer may not have been aware of the services affected by a service disconnect, and once provided with this information, may choose to cancel the restrict service order and implement a restore.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

What is claimed is:

1. A method of modifying a network service comprising:
   identifying a service to be modified;
   determining services affected by the identified service;
   performing a modification of a service level of at least the identified service, wherein the modification of the service level comprises a logical interruption of at least the identified service; and
   receiving a request for a cancellation or postponement of the modification of the service level.

2. The method of claim 1, further comprising performing a modification of the service level of the services affected by the identified service.

3. The method of claim 1, further comprising removing the modification of the service level upon said request.

4. The method of claim 1, further comprising performing a restoration of the identified service and the services affected by the identified service after the modification of the service level, wherein the restoration comprises a logical restoration of the identified service.

5. The method of claim 1, wherein the identifying step comprises receiving a request from a customer for a modification of the service level.

6. The method of claim 1, wherein the modification is a service restriction.

7. The method of claim 1, wherein the modification is a service restoration.

8. A method of modifying a network service comprising:
   identifying a service to be modified;
   determining services affected by the identified service;
   performing a modification of a service level of at least the identified service, wherein the modification of the service level comprises a logical interruption of at least the identified service; and
   performing a restoration of the identified service and the services affected by the identified service after the modification of the service level, wherein the restoration comprises a logical restoration of the identified service.

9. The method of claim 8, further comprising performing a modification of the service level of the services affected by the identified service.

10. The method of claim 8, further comprising receiving a request for a cancellation or postponement of the modification of the service level.

11. The method of claim 10, further comprising removing the modification of the service level upon said request.

12. The method of claim 8, wherein the identifying step comprises receiving a request from a customer for a modification of the service level.

13. The method of claim 8, wherein the modification is a service restriction.

14. The method of claim 8, wherein the modification is a service restoration.

15. A method of modifying a network service comprising:
   identifying a service to be modified;
   determining services affected by the identified service; and
   performing a modification of a service level of at least the identified service, wherein the modification of the service level comprises a logical interruption of at least the identified service and
   the modification is a service restoration.

16. The method of claim 15, further comprising performing a modification of the service level of the services affected by the identified service.

17. The method of claim 15, further comprising receiving a request for a cancellation or postponement of the modification of the service level.

18. The method of claim 17, further comprising removing the modification of the service level upon said request.

19. The method of claim 15, wherein the identifying step comprises receiving a request from a customer for a modification of the service level.

\* \* \* \* \*